United States Patent
Hamiti et al.

(10) Patent No.: US 7,394,807 B2
(45) Date of Patent: Jul. 1, 2008

(54) COMMUNICATION SYSTEM AND METHOD PROVIDING A MODE SELECTION PROCEDURE

(75) Inventors: Shkumbin Hamiti, Espoo (FI); Janne Parantainen, Helsinki (FI); Mikko Puuskari, Helsinki (FI); Heikki Einola, Espoo (FI); Tuija Hurtta, Espoo (FI); Serge Haumont, Helsinki (FI); Teemu Jäppinen, Espoo (FI); Marc Greis, Irving, TX (US)

(73) Assignee: Nokia Corporation, Espoo (FI)

( * ) Notice: Subject to any disclaimer, the term of this patent is extended or adjusted under 35 U.S.C. 154(b) by 692 days.

(21) Appl. No.: 10/344,573
(22) PCT Filed: Aug. 10, 2001
(86) PCT No.: PCT/EP01/09292

§ 371 (c)(1),
(2), (4) Date: Sep. 3, 2003

(87) PCT Pub. No.: WO02/15627

PCT Pub. Date: Feb. 21, 2002

(65) Prior Publication Data

US 2004/0047437 A1 Mar. 11, 2004

(30) Foreign Application Priority Data

Aug. 14, 2000 (EP) .................................. 0007932

(51) Int. Cl.
*H04L 12/56* (2006.01)
(52) U.S. Cl. ...................... 370/389; 370/328; 370/401; 370/471
(58) Field of Classification Search ................. 370/465, 370/231, 235, 236, 276, 277, 312, 329, 332, 370/354, 389, 392, 393, 445, 467, 521; 455/435.1, 455/435.2, 450, 455

See application file for complete search history.

(56) References Cited

U.S. PATENT DOCUMENTS 5,452,287 A * 9/1995 DiCecco et al. ............. 370/236

(Continued)

FOREIGN PATENT DOCUMENTS

JP 11017840 A * 1/1999

(Continued)

OTHER PUBLICATIONS

Plasse, D.; "Call control scenarios in the "all-IP"UMTS core network"; The 11th IEEE International Symposium on Personal, Indoor and Mobile Radio Communications, 2000. PIMRC 2000.; vol. 1, Sep. 18-21, 2000 pp. 322-326.*

Primary Examiner—Ricky Q. Ngo
Assistant Examiner—Gary Mui
(74) Attorney, Agent, or Firm—Squire, Sanders & Dempsey, L.L.P.

(57) ABSTRACT

A method and a communication system which includes a first network element, e.g. portable terminal, connectable to a second network element. One of selectable modes is used for communication. A network element is adapted to perform a mode selection procedure for selecting the same mode for bidirectional communication between the network elements. The mode selection ensures the use of one and the same mode in uplink and downlink direction and thus enables e.g. IP telephony in UMTS using SIP protocol. The invention provides for facilitating a VoIP communication session by way of a radio link with a mobile station. The mobile station forms a QoS (Quality of Service) information element for communication to a radio access network portion. The QoS information element is indicating whether to remove packet header information of the data packets to be communicated upon the radio link pursuant to the communication session.

10 Claims, 8 Drawing Sheets

U.S. PATENT DOCUMENTS

| | | | |
|---|---|---|---|
| 5,646,945 A * | 7/1997 | Bergler | 370/419 |
| 5,924,026 A | 7/1999 | Krishnan | 455/414 |
| 6,058,115 A * | 5/2000 | Sawyer et al. | 370/401 |
| 6,075,787 A * | 6/2000 | Bobeck et al. | 370/395.2 |
| 6,104,929 A * | 8/2000 | Josse et al. | 455/445 |
| 6,208,638 B1 * | 3/2001 | Rieley et al. | 370/354 |
| 6,356,533 B1 * | 3/2002 | Bruno et al. | 370/252 |
| 6,366,577 B1 * | 4/2002 | Donovan | 370/352 |
| 6,434,168 B1 * | 8/2002 | Kari | 370/521 |
| 6,522,658 B1 * | 2/2003 | Roccanova | 370/441 |
| 6,584,098 B1 * | 6/2003 | Dutnall | 370/354 |
| 6,654,610 B1 * | 11/2003 | Chen et al. | 455/450 |
| 6,658,235 B1 * | 12/2003 | Tolmunen et al. | 455/67.13 |
| 6,839,339 B1 * | 1/2005 | Chuah | 370/349 |
| 7,031,703 B1 * | 4/2006 | Graf et al. | 455/432.1 |
| 7,046,658 B1 * | 5/2006 | Kundaje et al. | 370/352 |
| 7,072,336 B2 * | 7/2006 | Barany et al. | 370/389 |
| 2001/0005382 A1 * | 6/2001 | Cave et al. | 370/466 |
| 2001/0026548 A1 * | 10/2001 | Strathmeyer et al. | 370/356 |
| 2002/0034166 A1 * | 3/2002 | Barany et al. | 370/329 |
| 2003/0031200 A1 * | 2/2003 | Lehtimaki | 370/467 |

FOREIGN PATENT DOCUMENTS

| | | | |
|---|---|---|---|
| JP | 11163960 A | * | 6/1999 |
| JP | 11313371 A | * | 11/1999 |
| WO | 97/48212 | | 12/1997 |
| WO | 99/12329 | | 3/1999 |
| WO | 01/08434 | | 2/2001 |

* cited by examiner

| | 8 | 7 | 6 | 5 | 4 | 3 | 2 | 1 | |
|---|---|---|---|---|---|---|---|---|---|
| 112 | QUALITY OF SERVICE IEI | | | | | | | | OCTET 1 |
| 114 | LENGTH OF QUALITY OF SERVICE IE | | | | | | | | OCTET 2 |
| 116 | 0 0 SPARE | | | DELAY CLASS 118 | | | RELIABILITY CLASS 122 | | OCTET 3 |
| 124 | PEAK THROUGHPUT | | | 0 SPARE | | PRECEDENCE CLASS 128 | | | OCTET 4 |
| 132 | 0 0 0 SPARE | | | MEAN THROUGHPUT 134 | | | | | OCTET 5 |
| 136 | TRAFFIC CLASS | | | DELIVERY ORDER 138 | | DELIVERY OF ERRONEOUS SDU 142 | | | OCTET 6 |
| 144 | MAXIMUM SDU SIZE | | | | | | | | OCTET 7 |
| 146 | MAXIMUM BIT RATE FOR UPLINK | | | | | | | | OCTET 8 |
| 148 | MAXIMUM BIT RATE FOR DOWNLINK | | | | | | | | OCTET 9 |
| 152 | RESIDUAL BER | | | | SDU ERROR RATIO 154 | | | | OCTET 10 |
| 158 | TRANSFER DELAY | | | | | TRAFFIC HANDLING PRIORITY 162 | | | OCTET 11 |
| 164 | GUARANTEED BIT RATE FOR UPLINK | | | | | | | | OCTET 12 |
| 166 | GUARANTEED BIT RATE FOR DOWNLINK | | | | | | | | OCTET 13 |
| 168 | SPARE | | | | | HEADER ADAPTATION 172 | | | OCTET 14 |

FIG. 9

COMMUNICATION SYSTEM AND METHOD PROVIDING A MODE SELECTION PROCEDURE

FIELD AND BACKGROUND OF THE INVENTION

The present invention relates to a communication system adapted to perform a mode selection by selecting or negotiating the mode to be used. Furthermore, the invention relates to a method to be performed in such a communication system, and to a network element capable of mode selection.

Advancements in digital communication techniques have permitted increased data transmission rates and introduction of new types of communication services. When digital communication techniques are utilized, data which is to be communicated is digitized into digital form, and sometimes formatted into data packets. The data packets are communicated, either individually, or in groups, to a destination. Once received at the destination, the packets are concatenated together to recreate the informational content of the data of which the data packets are formed.

Radio communication systems are exemplary of communication systems which have benefited from advancements in communication technologies and in which digital communication techniques are increasingly utilized. A cellular communication system is an exemplary radio communication system. And, various standards have been promulgated pursuant to which different types of cellular communication systems have been constructed. Additional standard specifications continue to be promulgated relating both to improvements to existing cellular communication systems as well as new constructions of cellular communication systems. Standards relating to so-called, third-generation, cellular communication systems are presently being promulgated. Standards relating to the 3G (third generation) GSM/EDGE (Global System for Mobile Communications/Enhanced Data for Global Evolution) system, for instance are being promulgated.

In packet switched communications, data to be communicated is formatted into packets, and the data packets are communicated at discrete intervals. Because the data can be communicated at discrete intervals, the communication resources, such as the bandwidth available upon the radio links formed between mobile stations and network infrastructure of the system, can be utilized more efficiently.

Packet-switched communications in which communications are effectuated by the communication of data packets include voice communications. When the data packets are formatted pursuant to IP (Internet Protocol) protocols, the resultant communication service is sometimes referred to as VoIP (Voice over Internet Protocol). As with other types of voice communication services, VoIP is time sensitive in that the data forming the VoIP data packets must be timely communicated to maintain an acceptable communication quality level.

The data packets are typically formatted pursuant to conventional standards. Each data packet is typically formatted to include a header portion and a payload portion. The payload portion is formed of the data which is to be communicated to effectuate the communication service. In a VoIP service, the voice data is contained in the payload portion of the data packet. And, the header portion includes information needed to route the data to a desired receiving station and to identify the order of the data packet amongst a group of data packets. A conventional data packet includes an RTP (Real-time Transport Protocol) header field, a UDP field, and an IP (Internet Protocol) field. The RTP field includes a time stamp value which specifies the time when the voice data of the packet is created. The time stamp is used at a receiving station to correct for delay fluctuation introduced during communication of the data packet. The RTP field also includes a sequence number. The sequence number is used at a receiving station to detect packet loss and mis-sequencing of data packets. Values of the UDP and IP fields are generally of constant values for data packets generated within a single communication session and identify the identities of the sending and receiving stations.

Communication systems are usually bandwidth-constrained. That is to say, the bandwidth available to define communication channels and allocated for use in a communication system typically limit the communication capacity of the communication system. The communication capacity of the communication system can be increased only when the bandwidth allocated to the communication system is used more efficiently. Constraints placed upon radio communication systems are oftentimes particularly acute as the bandwidth allocated to a radio communication system is typically limited to a frequency region of the electromagnetic spectrum.

A problem associated with the use of packet-formatted data is the relatively high percentage of the bandwidth consumed by the communication of the header portions of all of the data packets. Communication of the voice information pursuant to a VoIP communication service is much less efficient than it otherwise would be if the header portions of the data packets are removed.

To increase the efficiency of use of the bandwidth allocated upon the radio link, proposals have been set forth to provide manners by which to remove the header portions of the data packets prior to their communication upon the radio links formed between mobile stations and the network infrastructure of the communication system.

More generally, communication networks transfer information such as user voice traffic or the like, on a packet-switched and/or circuit-switched basis using modes which may be commanded by the system or negotiated between the involved network elements such as end user equipments. As an example, in evolved networks such as UMTS (Universal Mobile Telecommunication System) systems, additional functions and services can be incorporated. For instance, novel multimedia services such as multimedia messaging services MMS are supported within the system which services are IP (Internet Protocol)-based services. Packet-based (e.g. IP-based) service sessions such as multimedia service sessions may be controlled by a specific protocol. As an example, the Session Initiation Protocol (SIP) represents a protocol which may be used e.g. for call and connection establishment as well as for transport of endpoint capability information. Such capability information may e.g. relate to voice and multimedia codecs supported by the end terminals.

The functionality and services of such multimedia service systems will be mapped onto the existing network system functions, e.g. of UMTS type. As an example, the system services may be mapped to the PDP contexts and radio signalling, as well as to existing packet-switched core network elements and interfaces, e.g. of UMTS type. Hence, there is a problem of multimedia (e.g. IP multimedia) and network layer (e.g. GPRS layer) interactions and mapping.

As an example, in case of VoIP calls (voice over IP-based connection, i.e. Internet telephony), the radio access network such as GERAN ("GSM/Edge Radio Access Network") and UTRAN (UMTS Terrestrial Radio Access Network), may be informed on the type of application for deciding on the header adaptation method to be used for e.g. a particular PDP context. As an example, two different header adaptation schemes available for selection can for example be "header compression" and "header stripping/removal". The header stripping/removal mode may be used for speech-only traffic where e.g. optimised speech transport is required for instance for integrated lower-end terminal devices. A header compression mode may be utilised e.g. for more general IP multimedia traffic including voice application operation on an external device such as a laptop computer connected to a UMTS phone.

When an inappropriate mode such as inappropriate protocol mode, header adaptation mode or radio access bearer mode should be selected, problems in incorrect message transmission may occur.

SUMMARY OF THE INVENTION

The invention provides a method and system as defined in anyone of the claims.

In more detail, a communication system, and/or a method to be performed in a communication system, comprises at least one first network element connectable to a second network element via one or more packet-based networks. At least one of the first and second network elements provide two or more selectable modes for communicating with another network element. A mode selection procedure is performed (e.g. by one or both of the network elements, or by a third network element connected to the first and second network elements), for selecting the same mode for bidirectional communication between the network elements. The selectable modes preferably are different codec types, or may be conversion modes of other type, or radio interface protocol types or channel-coding schemes etc.

The first and/or second network elements may be portable terminal equipments. The third network element preferably is a support node or support function.

In a preferred embodiment, a protocol mainly used for other purposes but also capable of providing a messaging service, preferably an IP-based multimedia messaging service, is used for sending information on supported or selected modes to and from the network elements. The protocol may be the Session Initiation Protocol (SIP). SIP is a multimedia session establishment & control protocol, i.e. a control protocol for realtime multimedia.

Preferably, the network or networks connecting the first and second network elements is/are UMTS-based network.

In one embodiment, the first network element may send information on one or more modes supported by the first network element to the third network element which performs the selection procedure and sends information on only one or more than one but not all supported modes to the second network element which sends an acknowledgment message to the third network element confirming the support of the selected, or one of the selected modes, the third network element sending a message to the first network element informing the latter on the selected mode. This is one difference between a preferred embodiment of the invention and the usual SIP operation. Usually there is no negotiation between the used codecs etc. but both elements include information on their own capabilities in the SIP messages. Here, a selection and a specific usage of the information fields etc. is proposed.

In another embodiment, the first network element may send information on one or more modes supported by the first network element to the third network element which requests the second network element to send information on the supported modes, the second network element returning a list of supported modes to the third network element whereupon the third network element performs the selection procedure and sends messages to the first and second network elements informing these network elements on the selected mode.

In a further embodiment, the first network element performs the selection procedure when initiating a connection to the second network element, and sends information on one mode supported by the first network element to the second network element. The second network element, when supporting the mode, returns an acknowledgment message, or, when not supporting the mode, returns a message indicating another mode supported by the second network element, to the first network element. The first network element selects this mode for further communication when supporting it, or, when the first network element does not support the mode indicated by the second network element, the above steps are repeated selecting another mode.

In a further embodiment, the first network element, when initiating a connection to the second network element, sends information on all modes supported by the first network element to the second network element. The second network element performs the selection procedure and returns a message indicating the selected mode to the first network element, the first and second network elements selecting the indicated mode for further communication.

The first network element and/or second network element and/or third network element preferably send information on the selected mode to a radio network control means. The information on the selected protocol mode may e.g. be sent as part of a negotiation procedure related to packet data convergence protocol, or in an Activate PDP Context message. The information on the selected mode preferably contains an additional flag indicating the application type. It is possible to send only the application type and no other information.

The information on the selected mode preferably contains additional information on the header processing such as header compression or header stripping/removal.

Generally, in accordance with the present invention, a selection procedure is provided for performing a mode selection, preferably when establishing a connection between two network elements. This mode selection such as protocol selection is ensuring that the bi-directional communication between the network elements is performed in a defined manner such as use of the same mode in uplink and downlink direction.

As an example, such a mode selection is able to ensure that e.g. the radio access bearers in an UMTS network use and support the same codec type (e.g. AMR (Adaptive Multi-Rate), GSM FR (Full Rate), GSM EFR (Enhanced Full Rate), etc.) at the same time, and use the same, i.e. only one, codec type in uplink and downlink directions. In some cases such as AMR, there might otherwise be provided different codec modes in uplink and downlink direction. The codec information may be used to select the appropriate radio interface protocol modes including an appropriate channel coding scheme for voice traffic.

The use of the same codec in both directions guarantees that the channel coding for the corresponding radio bearer of a PDP (Packet Data Protocol) context is appropriately and correctly selected so as to be the same in both directions. As at least one PDP context is necessary for carrying the voice traffic, an appropriate radio bearer is selected so that UMTS IP telephony can be performed (VoIP) without problems.

An advantage of the invention is the possibility to enable e.g. SIP operation on top of an UMTS radio access network architecture and bearers. Apart from the fact that the new information on selected mode and application type provided to the radio access network is already a sort of change of the existing network architecture, no other changes of existing radio access networks such as UTRAN or GERAN for any actual or future definition such as 3GPP Release 2000 are necessary for solving the above mentioned problems. The invention therefore provides a solution for IP telephony on UMTS.

The solution according to the invention can be implemented as a proprietary mechanism or function, or can be a standardised mechanism or function.

In accordance with a further aspect of the invention, a network element is provided, preferably to be used in a method or communication system as described above, the network element being adapted to perform a selection procedure for selecting one of several modes supported by this or another network element. The modes may be different conversion modes, in particular coding/decoding modes.

According to another aspect, the invention may provide a manner which facilitates signaling of whether the header portions of the data packets are to be removed pursuant to effectuation of a communication service. Signaling is preferably provided between the mobile station and the network infrastructure to identify when header portions of the data packets are to be removed pursuant to effectuation of a communication session. The invention provides signaling of such information and adequately defines the manner by which to signal whether the header portions of the data packets are to be removed. A QoS IE can be used for such a purpose, representing an example on how additional information on the selected protocol can be expressed. This feature of header stripping/removal can also be used independent of the other features mentioned in the description or claims.

In an embodiment, the invention provides an apparatus and method for initiation of header-portion removal in a radio communication system having a mobile station operable to communicate packet-switched data with a correspondent node by way of network infrastructure, the packet-switched data formatted into data packets, the data packets having header portions and payload portions. The header-portion removal facilites the communication of the packet-switched data upon a radio link formed between the mobile station and the network infrastructure.

A means or function, e.g. QoS (Quality of Service) information element (IE) message generator, is coupled to receive indications of selection of a preference to communicate data without the header portions upon the radio link. A QoS information element message containing an indication of the preference is generated.

Further aspects, advantages and details of the invention will be described by referring to the attached drawings which disclose preferred embodiments of the invention.

DETAILED DESCRIPTION OF PREFERRED EMBODIMENTS OF THE INVENTION

Before describing some embodiments of the invention in more detail, several general aspects and features of the invention will be discussed. In connection set-up, some protocols such as the call establishment procedures of SIP (Session Initiation Protocol) allow negotiation and usage of several codecs from end-to-end, that is between the call originating element and the call terminating element. Further, such protocols may also allow the use of different codecs in uplink and downlink directions. Due to the selection procedure performed in accordance with a preferred aspect of the invention, IP telephony applications in networks such as UMTS of third generation type can be used on top of the UMTS radio access networks (RANs) without interfering with the functionality of the system and with minimum changes of the system. Hence, correct functioning can be ensured also in such cases.

When using for instance SIP, the caller may send a set of supported codecs to the callee or to a third network element. The callee may also send a set of supported codecs to the caller or to the third network element. After the call-setup, when sending VoIP packets, the invention may be used to guarantee that the caller uses one of the codecs supported by the callee and the callee uses one of the codecs supported by the caller, and that these used codecs are the same for the callee and the caller. Otherwise, when not performing a mode selection procedure for selecting e.g. only one and the same codec for the bidirectional communication, the sender might dynamically select a codec from the set of codecs supported by the recipient when sending data to the latter so that different codecs might eventually be used. Furthermore, the used codec might be different in different directions.

In accordance with preferred implementations of the invention, several alternatives are disclosed. According to one aspect, a terminal equipment (network element), e.g. a UMTS phone, or the network, e.g. the UMTS network, functions so as to ensure that always only one codec type is used in each direction, and further that this codec type is the same in both directions. This may be achieved in one or both terminal equipments such as UMTS terminals by mandating support for specific codec(s) in all cases and/or by defining that only one codec can be announced to the other endpoint as supported codec.

Furthermore, the behaviour of the callee is defined and adapted in such a manner that the call terminating equipment selects, if possible, the same codec as the one announced by the call originating equipment. In case of failure of the call terminating equipment in selecting the same codec as the one announced by the call originating equipment, the call terminating equipment is preferably adapted to select a codec which is mandatory in systems of the third generation (3G systems), and to announce this codec to the call originating equipment. The call originating equipment will support the announced codec as it is a mandatory one, and is adapted to assume at this point that the call terminating equipment will use the same codec also in sending data, and will therefore adjust its behaviour accordingly.

In accordance with another alternative embodiment of the invention, a further solution is provided. In the network such as the UMTS network, a control means (third network element) will decide on the codec to be used and will handle the selection procedure and the necessary messages to be sent to the call originating and terminating equipments. This control means may e.g. be the CSCF (Call State Control Function) of the network and/or may e.g. be the proxy CSCF in the visited network such as PLMN (Public Land Mobile Network) in case of a roaming subscriber, and/or the home CSCF in the home network e.g. PLMN of the subscriber.

The control means can render the decision on the codec to be used by both the call originating and terminating equipments. In preferred implementation, the codecs supported by the call originating equipment are included in a specific message such as the Invite message of SIP. After receiving the Invite message, the control means such as CSCF can select one of the codecs, i.e. perform the mode selection procedure, and can modify the Invite message so as to include only the selected codec before forwarding the Invite message to the call terminating equipment. The call terminating equipment is adapted to acknowledge receipt the Invite message by sending an acknowledgement message such as 200 OK message of SIP, only if it supports the single codec indicated in the Invite message as selected by the control means. It is possible to send an acknowledgement message also in the negative case, e.g., giving negative acknowledge or including the supported codecs by the call terminating equipment.)

The selection procedure performed in the control means such as CSCF may be based e.g. on the operator preferences. As an example, when the operator prefers to use AMR, the selection procedure is adapted to select AMR from a set including FR, HR and AMR. Another example is a case when a transcoder pool is used. In such a case, the operator may optimise the usage of the transcoders. In the latter case, the decision and selection is preferably made in a control means of the visited network, that is in a visited network element such as e.g. in the proxy CSCF.

Furthermore, location information of the user may be taken into account when deciding on the coded to be used. For example, if the base station subsystems (BSSs) in different parts of the network/country are e.g. based on different product releases and for this or other reasons prefer different codecs, or for reasons of transcoder pool optimisation, the codec selection procedure may be adapted to take account of such parameters.

A further alternative approach implemented in another embodiment of the invention is the selection of the codec by a control network element such as CSCF after having received information on all codecs supported by the call originating equipment (e.g. in an Invite message) and on all codecs supported by the call terminating equipment (e.g. in the 200 OK message of SIP). After having received both the messages, the control means knows both codec sets supported by the call originating equipment as well as by the call terminating equipment. The control means then performs the mode selection step by selecting one codec supported by both call originating and terminating equipments either by arbitrarily or by reference to a priority list ranking the codecs according to the priority assigned by e.g. the network operator or service provider.

After selecting the codec to be used by both call originating and terminating equipments, the selected codec is sent to the call originating equipment in a further message such as a 200 OK message of SIP generated by modifying the 200 OK message received from the call terminating equipment, and to the call terminating equipment in another message such as a ACK message of SIP.

When the codec to be used has been selected, one or more network elements, in particular control elements such as the radio network controllers or base station subsystems controlling the radio access to the call originating and/or call terminating equipment have to be informed on the selected codec. This informing of the network control elements can be performed in several alternative ways which are listed below in the preferred order.

1.) The call originating and/or terminating equipment such as a mobile station (MS) sends information on the selected codec to the radio access controller (e.g. RNC, Radio Network Controller) as part of the PDCP (Packet Data Convergence Protocol) negotiation. The messages sent to the control element informing the same about the selected codec may additionally include a separate flag or other indication to indicate the application type, and/or whether to use header compression or header stripping/removal for this particular PDP context.

2.) As an alternative, the call originating and/or terminating equipment sends the information on the selected codec to the serving node such as SGSN (Serving GPRS Support Node). The serving node forwards the information on the selected codec to the control element such as RNC in the RAB (Radio Access Bearer) establishment request message. The transmitted message(s) may additionally include further information such as a flag to indicate the application type, and/or whether to use header compression or stripping/removal for a particular PDP context.

3.) The call state controlling means such as CSCF may send information on the selected codec to the radio access control means such as RNC (e.g. in the following manner: CSCF->GGSN (Gateway GPRS Support Node), GGSN->SGSN, SGSN->RNC). As already stated above, the messages may also include a separate indication such as a flag to indicate the application type, and/or whether to use header compression or stripping/removal for the particular PDP context.

When an application type indication (e.g. application type flag) is included, the information on the application type is transmitted from the call originating or terminating equipment (e.g. Mobile Station MS) or from the call control means (e.g. CSCF) because these entities are, in an UMTS network, the only entities having enough information about the services and applications running on top of the PDP contexts. The header compression is preferably set as the default operation if the application type is not known or indicated in the message. The header stripping/removal is preferably used for optimised speech transmission when only voice traffic is carried in the PDP context.

The necessary application information is preferably received through internal application programming interfaces (APIs) of the call originating and/or terminating equipments (the. internal APIs being arranged between the applications/services), the SIP layer and the UMTS/GPRS layers. Header stripping/removal is preferably used only in the case of an integrated UMTS SIP terminal. It may also be provided from a laptop computer to a UMTS phone in a case where the terminal equipment (TE) and the call originating and/or terminating equipments are separate devices. The application type indication such as a flag may for example have the following explicit values: "header compression", or "header stripping/removal", or "application type" (e.g. value: voice) which indicates that stripping/removal is to be used.

Figure 1:
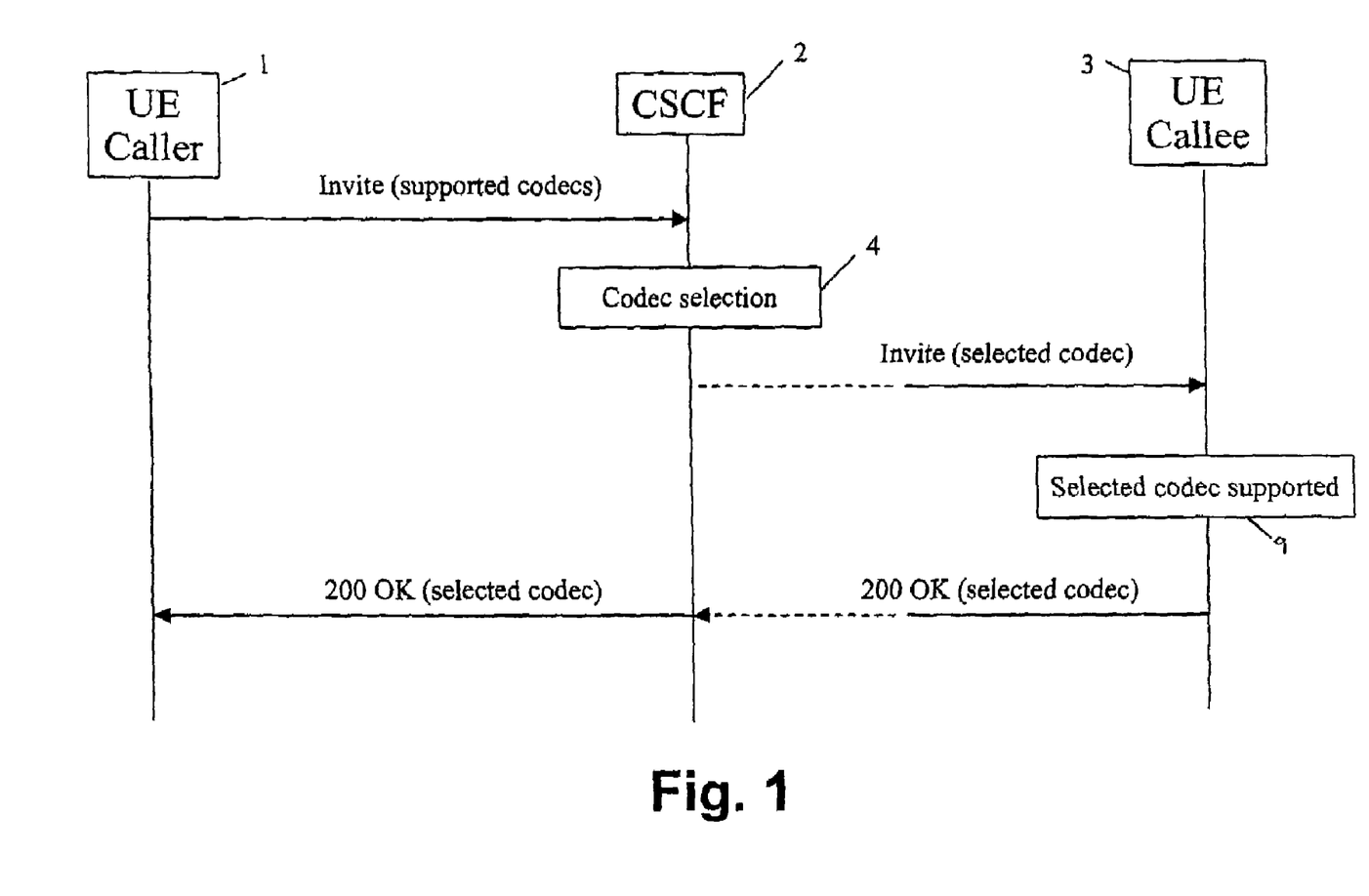
FIG. 1 shows the basic structure of a first embodiment of the present invention.

In the following, details of a first embodiment will be described with reference to FIG. 1. FIG. 1 shows a terminal network element 1 which is termed "UE (User Equipment) Caller" and requests the establishment of a connection to another network element 3. The network element 3 thus represents a call terminating equipment and is termed "UE Callee". The network comprises a further network element 2 which is a connection control element and is implemented as, or provides, a call state control function (CSCF). When the network element 1 such as a MS (Mobile Station) desires to establish a connection to the terminal network element 3, it is adapted to send, in this embodiment, a message to the CSCF 2 informing the latter on the desire to establish a connection to the terminal equipment element 3 which message contains information on all codecs supported by the network element 1, i.e. the call originating equipment. This message may be an Invite message of the connection protocol, preferably SIP. This Invite message contains a list of codecs supported by network element 1.

The CSCF element 2 is adapted to perform a mode selection procedure which, in this embodiment, is a codec selection procedure 4 selecting one of the codecs supported by equipment 1. This codec selection 4 may be based on preference or priority parameters contained in CSCF 2, or may be dependent from the type of application desired by equipment 1 such as pure data transmission, pure voice over IP transmission, and the like.

After performing the codec selection procedure 4, the CSCF 2 further transmits the Invite message to the user equipment 3, the message now only including the codec selected by the codec selection procedure 4. The user equipment 3 which may likewise be a mobile station or stationary equipment, performs an internal check whether it supports the codec indicated in the received Invite message 9. If yes, the user equipment 3 returns an acknowledgment message to the CSCF 2 (preferably a 200 OK message in SIP) which message repeats the selected codec for confirmation of its support by user equipment 3. The CSCF 2 transmits this acknowledgment message to the user equipment 1 (200 OK (selected codec)) in SIP.

When receiving this message, the user equipment 1 is adapted to use only this indicated codec for uplink and downlink links. In a similar manner, user equipment 3 is adapted to use only the selected codec for uplink and downlink traffic, i.e. for radio access between user equipment 3 and the radio access controlling means such as RCP (Radio Network Controller). The radio network controllers handling the radio access to the user equipments 1 and 3 will likewise be informed on the selected codec using one of the above-mentioned methods as an example, and will adapt their operation mode accordingly.

When the user equipment 3 should not support the selected codec indicated in the Invite message received from CSCF 2, it is preferably adapted to send a message to CSCF 2 informing the latter on lack of support of the selected codec. Thereupon, the CSCF 2 repeats the codec selection procedure 4 but now selecting another codec different from the first selected codec, and sends this newly selected codec in a message such as an Invite message to user equipment 3. When this codec is supported by user equipment 3, it returns the 200 OK message, otherwise the above steps are repeated until a codec is selected which is supported by the user equipment 3

Figure 2:
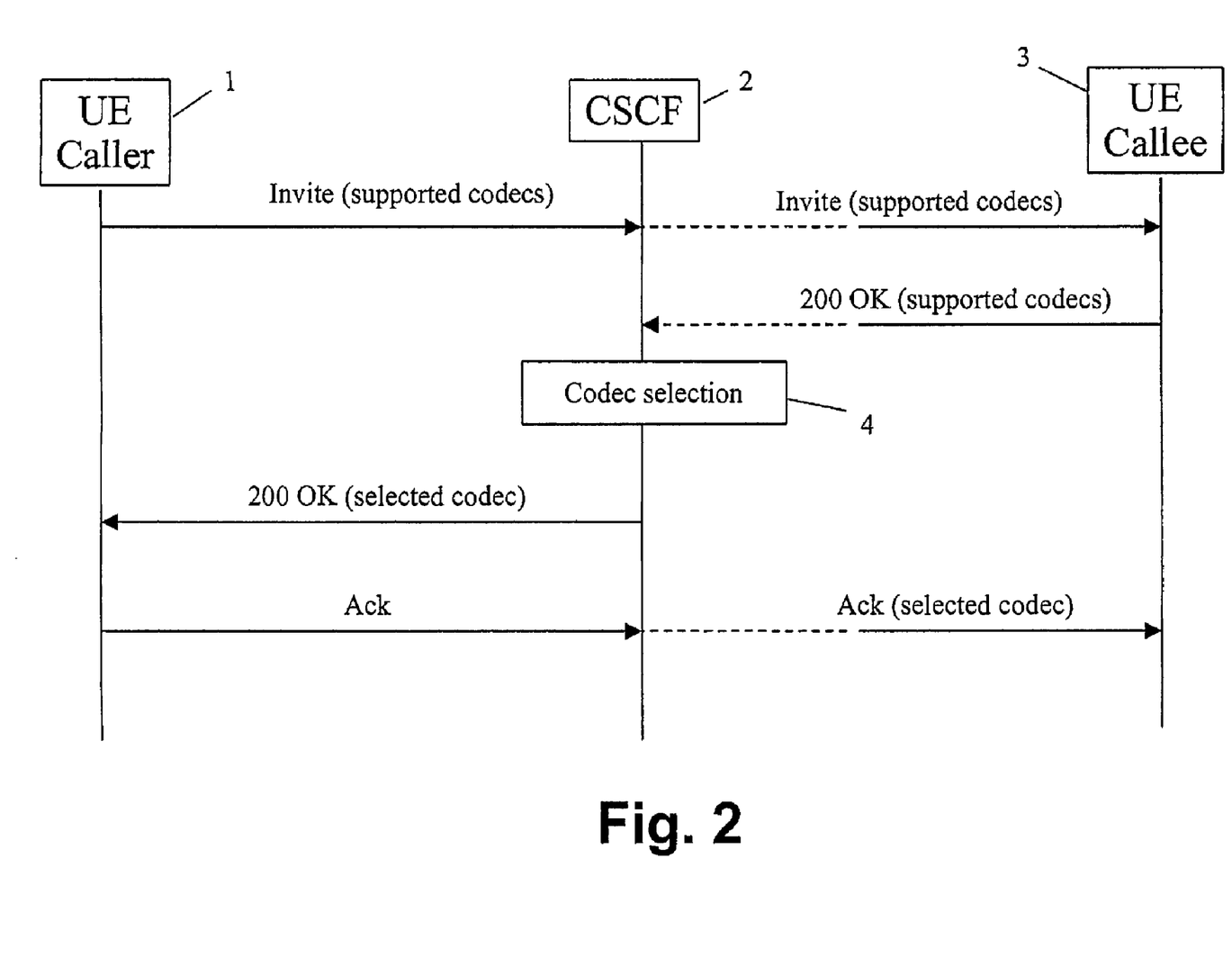
FIG. 2 illustrates a second embodiment of the invention.

FIG. 2 shows another embodiment of the invention wherein the codec selection procedure 4 is performed, similar as in the first embodiment, by CSCF 2. Contrary to the above discussed first embodiment, the CSCF 2 requests, after receipt of an Invite message indicating all or at least some of the codecs supported by the user equipment 1, the user equipment 3 to return information on all codecs supported by user equipment 3. This message may be an Invite message of SIP defining a request for returning a list of supported codecs. The user equipment 3 returns a message (e.g. 200 OK message of SIP) which contains a list of codecs supported by user equipment 3.

This list may contain all codecs supported by user equipment 3, or may indicate only those codecs which are also supported by the user equipment 1. In the latter case, the user equipment 3 receives, in the Invite message from CSCF 2, a list of the codecs supported by the user equipment 1, and is adapted to perform a comparison of codecs supported by user equipment 1 and codecs supported by user equipment 3, selecting only those codecs which are supported by both user equipments 1 and 3. In the former case in which the list returned by the user equipment 3 includes all supported codecs, the Invite message sent from CSCF 2 to the user equipment 3 may not contain any indication of codecs supported by user equipment 1.

The CSCF 2 selects, by the codec selection procedure 4, one of the codecs supported by both user equipments 1 and 3, and then sends messages to both user equipments 1 and 3 informing them on the selected codec for use thereof during the subsequent connection. The message addressed to user equipment 1 may be a message 200 OK of SIP indicating the selected codec. The user equipment 1 may return an acknowledgement message to the CSCF 2 acknowledging the receipt of the 200 OK message and eventually repeating the selected codec. The CSCF 2 may forward the acknowledgement message received from user equipment 1 to user equipment 3 after adding (if not already included) an information indicating the selected codec.

The embodiment of FIG. 2 contributes to a very quick selection of a codec supported by both user equipments.

All explanations, features and advantages stated above with regard to the first embodiment are also applicable with regard to this second embodiment (unless being in contradiction to the above explanations), and also for the subsequently discussed embodiments 3 and 4.

Figure 3:
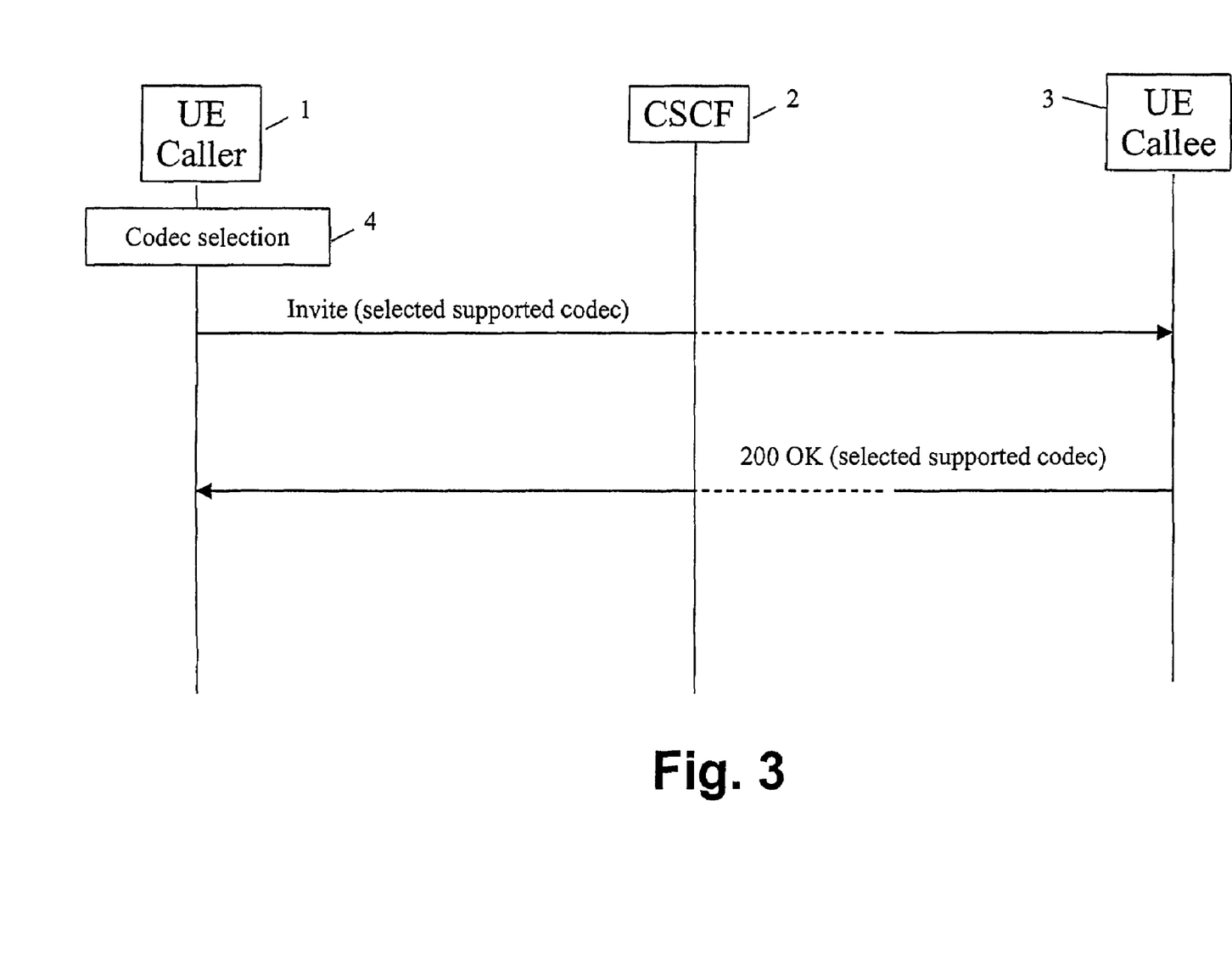
FIG. 3 shows another embodiment of the invention.

The embodiment shown in FIG. 3 is different from the above discussed first and second embodiment in that the codec selection procedure 4 is performed by and in the user equipment 1. After having performed the codec selection depending on the intended application (voice transmission, non-real-time traffic or the like, or depending on other parameters, the user equipment 1 sends a message such as an Invite message to the user equipment 3 via the CSCF 2, indicating the selected codec. The user equipment 3, when supporting the selected codec, returns, via CSCF 2, an acknowledgement message which may be a 200 OK message indicating the selected supported codec.

In case user equipment 3 does not support the selected codec, the repetition of the codec selection procedure 4 including the transmission of the related messaging, is repeated, as already stated above with regard to the first embodiment (with the exception that the code selection procedure 4 is repeated in the user equipment 1 and not in the CSCF 2. All other explanations given above with regard to the first and second embodiments likewise apply to this third embodiment.

Figure 4:
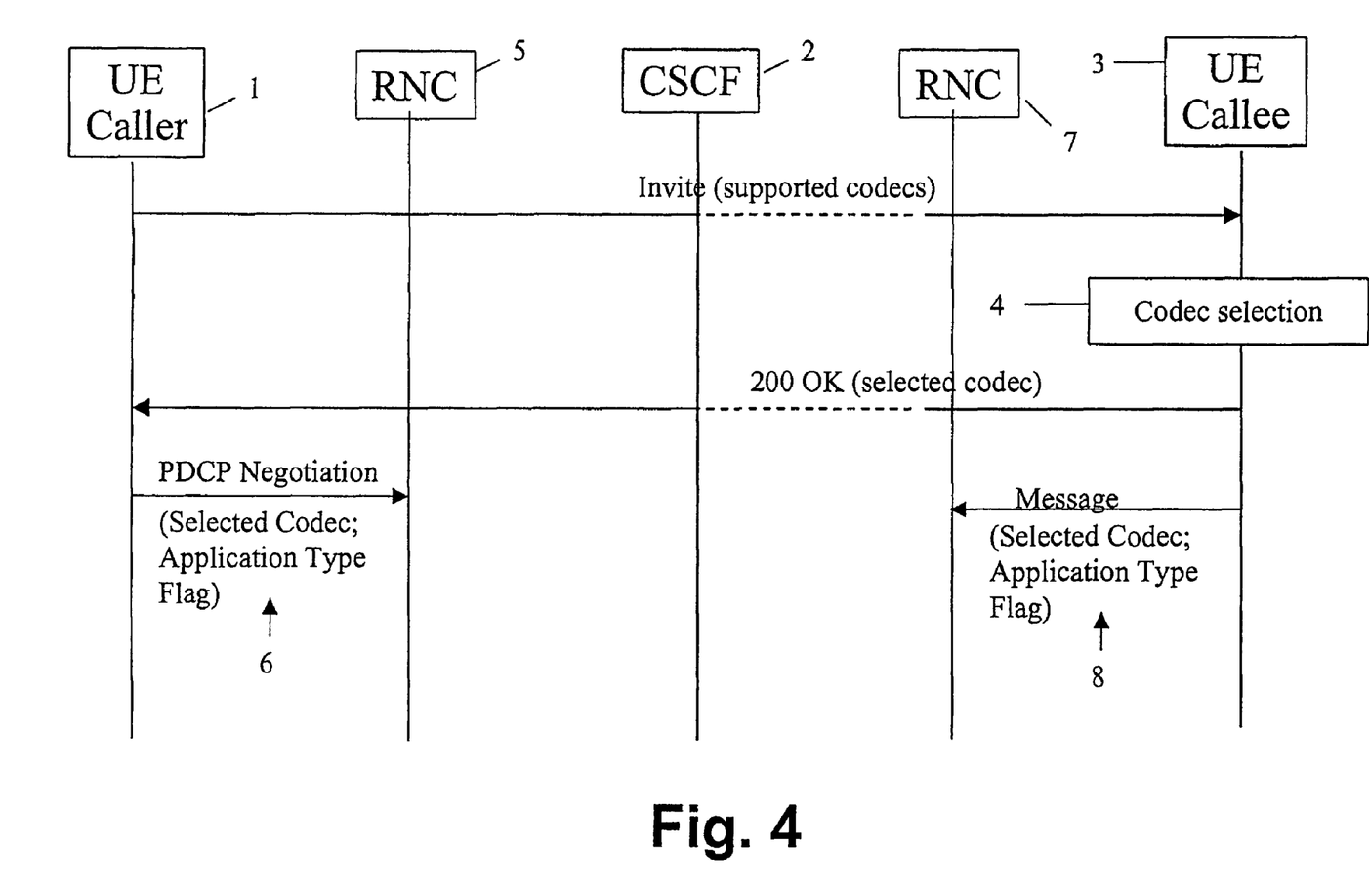
FIG. 4 illustrates a further embodiment of the invention.

FIG. 4 illustrates a fourth embodiment wherein the codec selection procedure 4 is performed in the user equipment 3. In this case, the user equipment 1 sends a message, via CSCF 2, to the user equipment 3 indicating all codecs supported by user equipment 1. This message may be an Invite message of SIP. After having received information on the codecs supported by user equipment 1, the user equipment 3 performs the codec selection procedure 4 by selecting, from the list of codecs supported by user equipment 1, one of the codecs which is also supported by user equipment 3. After having performed the codec selection procedure 4, the user equipment 3 sends a message to the user equipment 1, via the CSCF 2, informing user equipment 1 and eventually also CSCF 2, on the selected codec. The selected codec is thereafter used by both user equipments 1 and 3. All other explanations given above with regard to the first to third embodiment likewise apply to the present fourth embodiment.

As shown in FIG. 4 (the procedure shown in FIG. 4 is preferably common to all the earlier embodiments of the invention), a radio access controller such as RNC 5 being in charge of radio access control to user equipment 1 is informed by user equipment 1 on the selected codec, and preferably also on the application type by sending an application type flag indicating e.g. "header compression" or "header stripping/removal". This information can be sent when performing the PDCP negotiation 6 but may also be sent in a separate message. In a similar manner, the user equipment 3 informs its radio access control element such as RNC 7 being in charge of radio access control to user equipment 3 by sending a message 8 to RNC 7. This message indicates the selected codec and may also contain, if known, an application type flag.

This informing of the radio access control elements 5 and 7 in charge of the radio access to and from the user equipments 1 and 3, respectively, is likewise applicable to all above described first to third embodiments in identical manner.

The following embodiments of the invention relate generally to apparatus, and associated method, for initiating header removal of packet data communicated upon a radio link a manner by which to facilitate initiation of header removal procedures in packet-switched communications effectuated by way of a radio link, such as VoIP (Voice over Internet Protocol) communications in a 3G (third generation) cellular communication system effectuated pursuant to a communication session. More particularly, the embodiments relate to an apparatus, and an associated method, by which to generate a message selectably indicating a preference to remove the packet headers preliminary to effectuation of the communication session. In a Quality of Service Information Element (QoS IE), e.g. proposed for use in a 3G GSM/EDGE (Global System for Mobile Communications/Enhanced Data for Global Evolution) system, a header adaptation field is defined in an available section, e.g. octet. Values of the bits formed in the header adaptation field are selected to indicate whether the header portions are to be removed.

Generally, communication technologies permit the introduction, and popular usage, of new types of communication systems resulting, for example, in significant increases in the rates of data transmission. The increased data transmission rates allow for new types of communication services.

The embodiments of the invention, accordingly, advantageously provide apparatus, and associated method, by which to facilitate initiation of header removal procedures in packet-switched communications effectuated by way of a radio link, such as a VoIP (Voice over Internet Protocol) communications in a 3G (third generation) cellular communication system effectuated pursuant to a communication session.

Through operation of an embodiment of the present invention, a message is generated indicating a preference whether to remove the packet headers preliminary to effectuation of the communication session. In a Quality of Service Information Element (QoS IE) proposed for use in a 3G GSM/EDGE (Global System for Mobile Communications/Enhanced Data for Global Evolution) system, a header adaptation field is defined in an available octet. Values of the bits formed in the header adaptation field are selected to indicate whether the header portions are to be removed.

In one aspect of the present invention, a header adaptation field is provided for a QoS (Quality of Service) information element communicated by a mobile station to the radio access network(RAN) portion of a radio communication system. The header adaptation field is selectably of values to initiate removal of the header portions of data packets to be communicated pursuant to a communication session, such as a VoIP (voice over internet protocol) communication session between the mobile station and another communication endpoint, such as a VoIP terminal connected to a packet data network.

In another aspect of the invention, a manner is provided by which to initiate, at a mobile station operable in a packet radio communication system a VoIP, or other, packet-based communication session in which header information is to be removed from the data packets prior to their communication upon a radio link formed with the mobile station. Header adaptation indicia is sent by the mobile station to a radio access network portion of the communication system pursuant to session initiation. The header adaptation indicia is of values indicating a preference to remove the header information during communication of the packet data to effectuate the communication session.

In one implementation, the header adaptation indicia is contained in a header adaptation field forming a portion of a QoS information element, formed generally pursuant to the 3 GPP standard promulgation, section 24.008 v4.1.1. The QoS information element is sent by user equipment, such as a mobile station as part of an active PDP (packet data protocol) request message, as part of communication session setup procedures. By removing the header portions of the data packets communicated upon a radio link during the communication with the user equipment, additional amounts of the limited available bandwidth of the radio link is made available for use to effectuate communication of non-overhead information.

A manner is thereby provided by which to initiate header removal of data packets communicated upon a radio link. Header removal is targeted primarily to the support of IP-based optimized speech in a cellular network. In order to permit a radio resource controller of a radio access network portion of the network to be able to decide whether header removal is applicable, signaling must be provided, either by a core network to which the radio access network portion is connected or by the mobile station. Operation of an embodiment of the present invention provides such signaling.

In these and other aspects, therefore, apparatus, and associated method, is provided for a communication system having a mobile station operable to communicate packet-switched data with a correspondent node, by way of network infrastructure. The packet-switched data is formatted into data packets which have header portions and payload portions. Header-portion removal is initiated to facilitate communication of the packet-switched data upon a radio link formed between the mobile station and the network infrastructure. A QoS (Quality of Service) information element (IE) message generator is coupled to receive indications of selection of a preference to communicate data packets without the header portions upon the radio link. The QoS information element message generator generates a QoS information element message containing an indication of the preference.

A more complete appreciation of these embodiments can be obtained from the accompanying drawings and the following detailed description of the embodiments.

Figure 5:
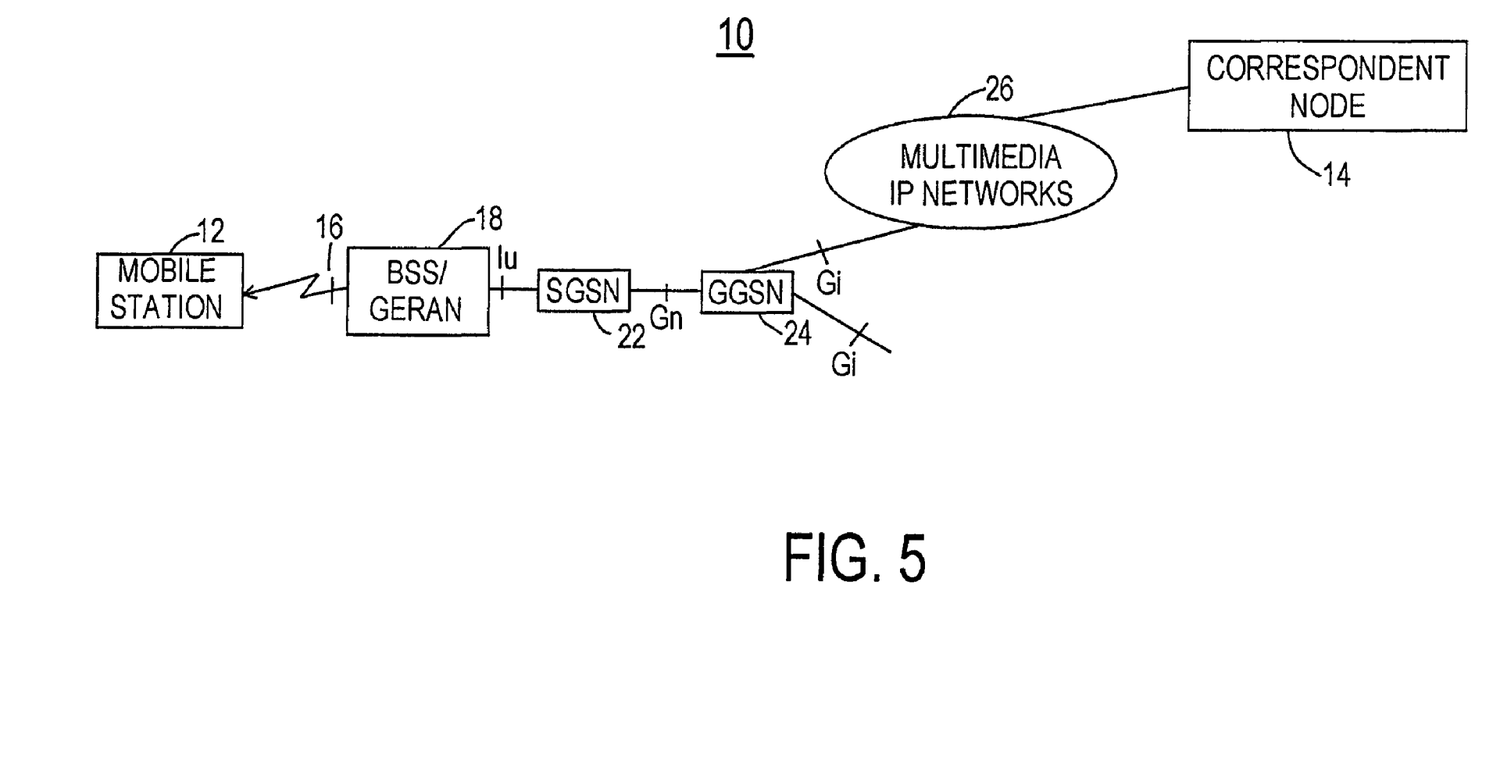
FIG. 5 illustrates a functional block diagram of a communication system in which an embodiment of the present invention is operable.

Referring first to FIG. 5, a communication system, shown generally as 10, provides for radio communication with a mobile station 12. Here, communications are effectuated pursuant to a communication session between the mobile station and a correspondent node 14. A communication path is formable between the correspondent node and the mobile station. The communication path is defined upon a radio link 16, elements of a base station system and radio access network (BSS/RAN) portion 18, an SGSN (Serving GPRS Service Node) 22, a GGSN (Gateway GPRS Service Node 24, and a packet data network backbone, here an IP (Internet Protocol) network 26.

The radio access network portion 18 includes network elements operable to permit the radio connection with the mobile station upon the radio link 16. In the exemplary implementation, the radio access network portion is generally constructed to be operable pursuant to a proposed GERAN (GSM/EDGE Radio Access Network), as presently promulgated.

The SGSN 22 and the BSS/GERAN 18 are interfaced by an Iu interface, analogous to a UTRAN interface. Separately, the radio access network portion is connectable to a 2G (second generation) packet switched core network by way of a Gb interface or, for instance, a 2G mobile switching center (MSC) by way of an A interface.

In exemplary operation in which data originated at the mobile station is communicated to the correspondent node, the mobile station forms the sending station. And, the correspondent node which receives the data forms the receiving station. As two-way communications are effectuable between the mobile station and the correspondent node, the correspondent node also forms a sending station, and the mobile station also forms a receiving station. Description of operation of an embodiment of the present invention can analogously be described with respect to communication of data by the correspondent node to the mobile station.

The communication session here forms, e.g., a voice-over internet protocol (VoIP) communication session. Speech transmission over the packet-switched network of which the communication system 10 is formed is realized through the use of RTP (real-time transmission protocol)-formatted packets. RTP packets are further encapsulated into a user data protocol (UDP) and internet protocol (IP) packets. Packet-switched speech transmission is generally referred to as voice-over IP (VoIP). The RTP control protocol (RTCP) is defined in the RTP specification. RTCP is used to monitor quality of service (QoS) and to give information about the participants of a communication session. RTCP packets are transmitted periodically, less often than transmission of RTP packets to limit the bandwidth consumptive RTCP traffic.

Packet-switched speech communications, such as pursuant to VoIP communications, enables an increase in the effective use of radio capacity, and, hence, connectivity between the mobile station and the correspondent node. Present proposals for the packet-switched speech transmission makes use of SIP/SDP for call control and RTP/RTCP protocols for the transmission of speech data, also in the 3G network.

Figure 6:
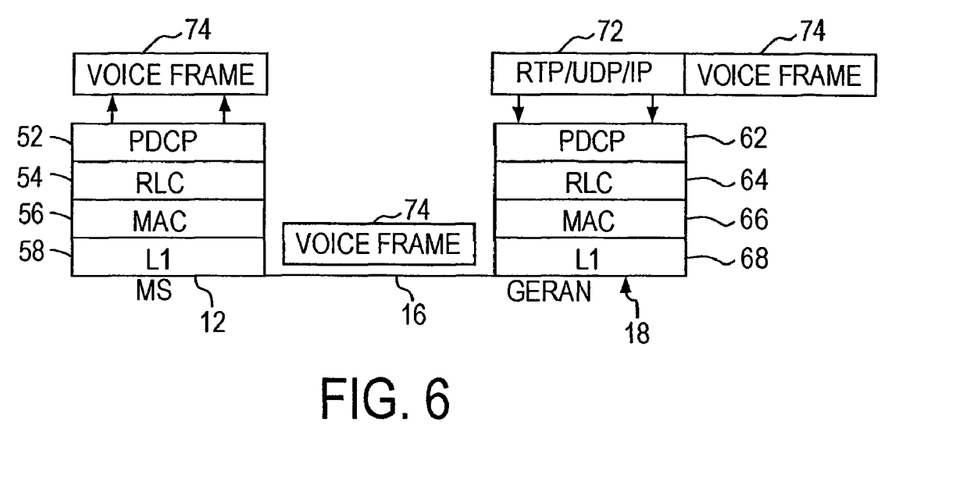
FIG. 6 illustrates a logical layer representation of portions of the communication system shown in FIG. 5, here representing packet header removal of packet headers from RTP (Real-Time Transport Protocol)-formatted data packets communicated during operation of the communication system.

FIG. 6 illustrates the communication system 10 in logical-layer form, here showing the mobile station 12 and the GERAN portion 18. The mobile station is shown to include an PDCP layer 52 positioned upon an RLC layer 54. The RLC layer 54, in turn, is positioned upon a MAC layer 56. And, the MAC layer is positioned upon a lower layer, L1, 58. Analogously, the GERAN portion 18 includes corresponding layers, here the PDCP layer 62, an RLC layer 64, a MAC layer 56, and a lower layer L1, 68. The radio link 16 is also shown in FIG. 6. Here, the RTP/UDP/IP headers 72, here shown to be followed by a voice frame 74, is routed to the radio access network portion 18. The headers are removed at the radio access network portion. Effectively, through the removal of the header information, the RTP/UDP/IP protocol end-point is within the network. And, the radio access network 18 acts as a proxy server for the user-plane traffic RTP. In the control plane, i.e., the planes 52 and 62 in FIG. 6, SIP/SDP terminates at the mobile station 12.

FIG. 7 again illustrates the mobile station 12 and the radio access network portion 18 in logical-layer form. The mobile station is shown to be formed of the layers 52, 54, 56, and 58. And, the radio access network portion is again shown to be formed of the layers 62, 64, 66, and 68. Here, a voice frame 74, originated at the mobile station, is routed upon the radio link to the radio access network portion. Once the voice frame is received at the radio access network portion, the RTP/UDP/IP header information 72 is added to the voice frame to permit routing through the network to the correspondent node.

Figure 7:
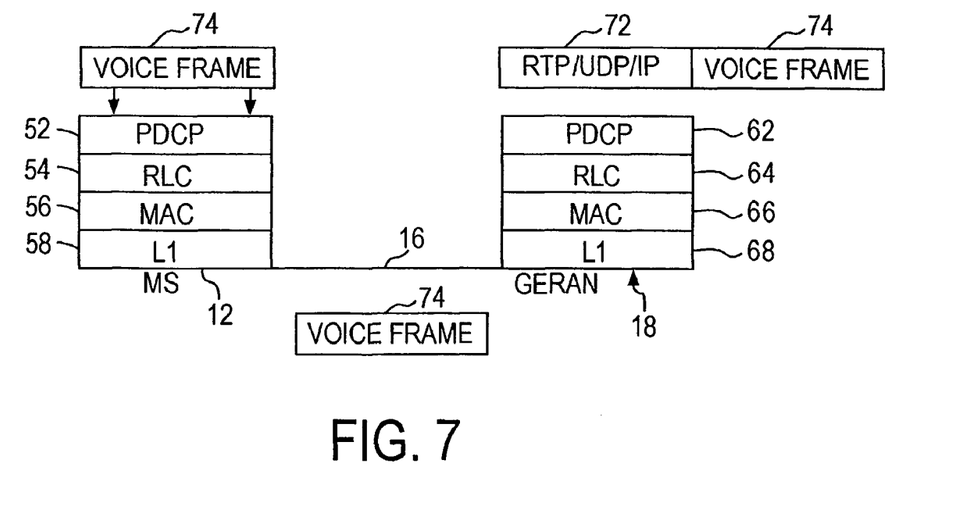
FIG. 7 also illustrates a logical layer representation of portions of the communication system shown in FIG. 5, here representing header generation by which packet header information is added to data packets communicated during operation of the communication system.
Figure 8:
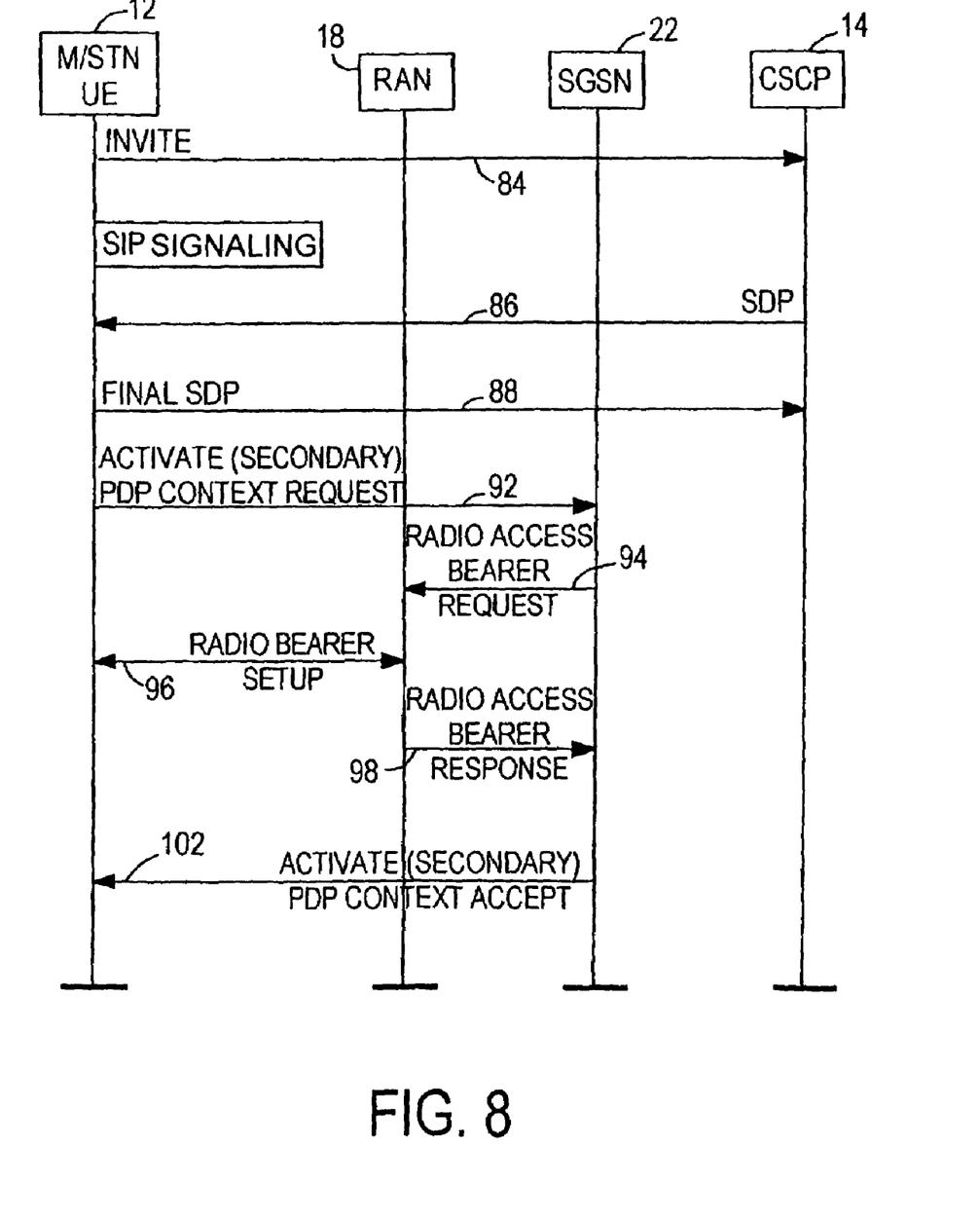
FIG. 8 illustrates a message sequence diagram illustrating messages generated during operation of the communication system shown in FIG. 5, including a message containing a QoS (quality of service) information element (IE) of an embodiment of the present invention.

FIG. 8 illustrates a message sequence diagram, shown generally at 82, showing certain of the messages generated during operation of the communication system 10 shown in FIGS. 5 to 7. The messages are generated pursuant to formation of a communication session between the mobile station 12, represented in FIG. 8 by the commonly-referenced user equipment block, and the correspondent node 14, indicated in FIG. 8 by the commonly-referenced CSCF (Call State Control Function). The CSCF is an SIP proxy, and the functionality thereof is defined by 3 GPP.

First, and as indicated by the segment 84, initiation of communication session set up is started. SIP signaling is utilized to set up the session, and the mobile station/user equipment is here the entity which knows the type of application which is to be used during the communication session.

The message indicated by the segment 84 forms an SIP Invite message. The Invite message asks a callee, here the correspondent node/CSCF to join a particular conference or establish a two-party conversation forming a communication session. The Invite message typically contains a session description, e.g., written in SDP format, that provides the called party with enough information to join the session. For multicast sessions, the session description enumerates the media types and formats that are permitted to be distributed to that session. For a unicast session, the session description enumerates the media types and formats that the caller is willing to use and where the caller wishes the media data to be sent. In either case, if the callee wishes to accept the call, it responds to the invitation by returning a similar description listing the media it wishes to use. For a multicast session, the callee should only return a session description if the callee is unable to receive the media indicated in the description of the caller or if the callee wants, instead, to receive data via a unicast session.

The message, indicated by the segment 86, is representative of such a response or an ACK (Acknowledge) indication returned to the mobile station. And, a final SDP message, sent by the mobile station/user equipment to the correspondent node/CSDF, is indicated by the segment 88. Additional details related to SIP signaling are set forth in the 3 GPP ETS 23.228 and 24.228. Once both endpoints of the proposed communication session have agreed to the communication session description, the mobile station/user equipment activates a PDP (Packet Data Protocol). An activate (secondary) PDP context request, indicated by the segment 92, is sent by the mobile station/user equipment to the SGSN 22. The request includes a QoS (quality of service) information element (IE). When, as here, the communication session is to be a VoIP communication session with optimized speech, i.e., with packet-data header removal, the QoS information element includes an indication of the preference to remove the RTP/UDP/IP headers from the data packets prior to their communication upon the radio link.

Responsive to the request, the SGSN generates a radio access bearer assignment request, indicated by the segment 94, and sends the request to the BSS/RAN 18. The radio access bearer assignment request, in the exemplary implementation, corresponds generally in value and structure with the request set forth in 3 GPP 25.413 and includes header adaptation field of an embodiment of the present invention as a portion thereof. The SGSN alternately can use a predefined QoS parameter combination in the radio access bearer message, thereby to provide unambiguous information to the GERAN that header removal can be utilized.

When the BSS/GERAN receives the radio access bearer assignment message, a header adaptation mechanism algorithm at the BSS/RAN is used to choose a header adaptation mechanism. And, thereafter, the BSS/GERAN generates a radio bearer setup message, indicated by the segment 96, for communication upon the radio link to the mobile station/user equipment to inform the mobile station/user equipment of the selections made thereat. The BSS/RAN also generates a radio access bearer response, indicated by the segment 98, which is returned to the SGSN 22.

Thereafter, and as indicated by the segment 102, an activate (secondary) PDP context accept message is generated by the SGSN. The message is sent, by way of the BSS/RAN and the radio link, to the mobile station/user equipment.

Figure 9:
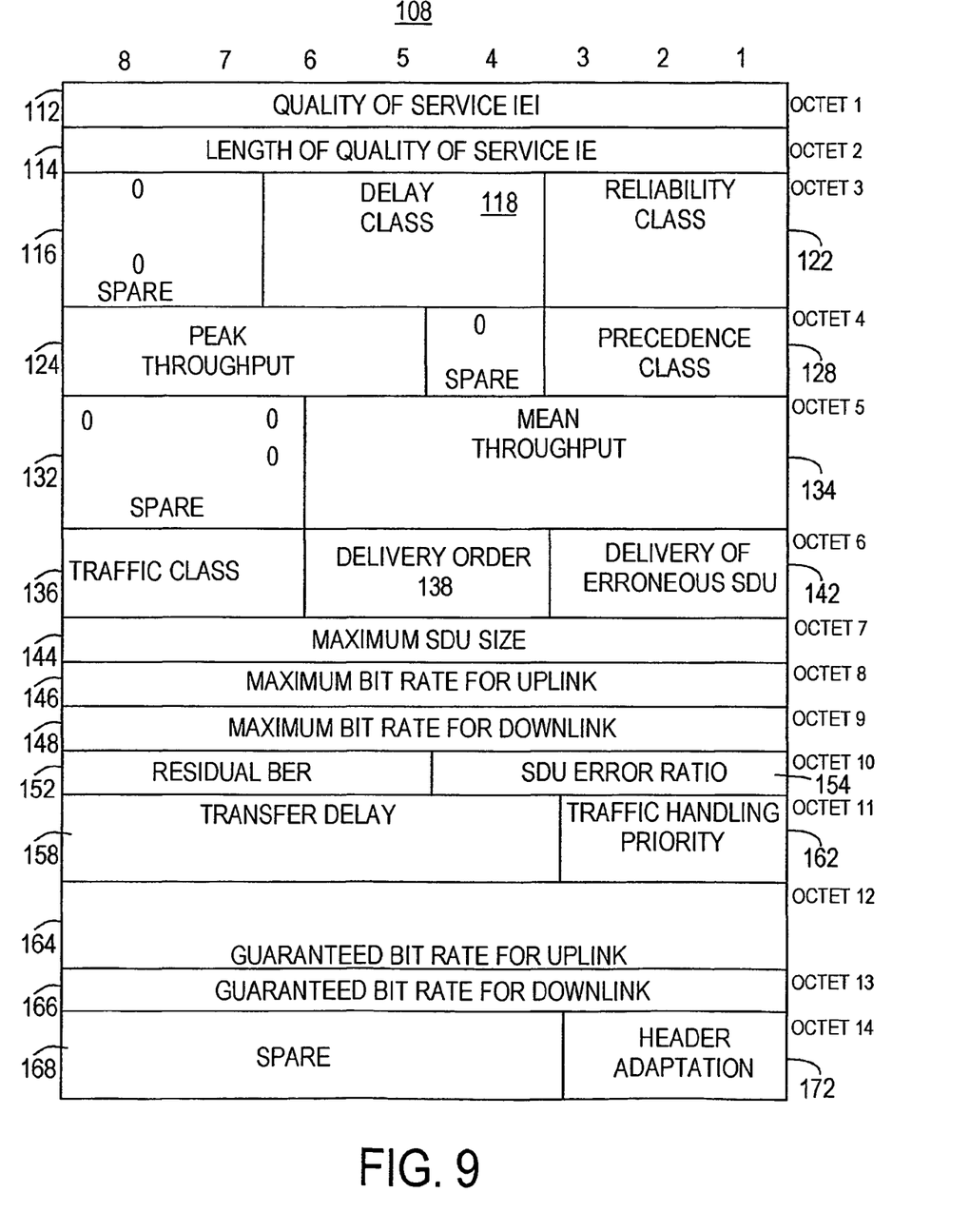
FIG. 9 illustrates representation of the QoS information element including indicia indicating a preference of a header adaptation mechanism to be utilized pursuant to a communication session.

FIG. 9 illustrates a QoS information element, shown generally at 108, which forms a portion of the activate (secondary) PDP context request, identified by the segment 92 in FIG. 8. The QoS information element generally corresponds in format to the format set forth in the 3 GPP ETS 24.008 v4.1.1 and is structured to include fourteen octets. The octets are numbered in the FIG. as octets 1 through 14. Each octet is of an eight bit length.

The first octet, octet 1, is formed of an eight-bit Quality of Service IEI field 112. The second octet, octet 2, is formed an eight-bit length of quality of service IE field 114. And, the third octet, octet 3, is formed of a two-bit 0 spare field 116, a three-bit delay class field 118, and a three-bit reliability class field 122.

The fourth octet, octet 4, includes a four-bit peak throughput field 124, a single-bit spare field 126, and a three-bit precedence class field 128. The fifth octet, octet 5, includes a three-bit spare field 132 and a five-bit mean throughput field 134. The sixth octet, octet 6, includes a three-bit traffic class field 136, a two-bit delivery order field 138, and a three-bit delivery of erroneous SDU field 142. And, the seventh octet, octet 7, forms an eight-bit maximum SDU size field 144.

The eighth and ninth octets, octet 8 and octet 9, also form single eight-bit fields. The eighth octet forms a maximum bit rate for uplink field 146, and the ninth octet forms a maximum bit rate for downlink field 148.

The tenth octet, octet 10, forms a four-bit residual BER field 152 and a four-bit SDU error ratio field 154. The eleventh octet, octet 11, forms a six-bit transfer delay field 158 and a two-bit traffic handling priority field 162.

The twelfth octet, octet 12, forms an eight-bit guaranteed bit rate for uplink field 164. And, the thirteenth octet, octet 13, forms a guaranteed bit rate for downlink field 166. The fourteenth octet, octet 14 forms a new octet and field pursuant to an embodiment of the present invention. The octet includes a six-bit spare field 168 and a two-bit header adaptation field 172.

The header adaptation field is of values to identify whether header removal of the header portions of the data packets to be communicated upon the radio link during a communication are to be removed. Viz., the values of the bits which populate the header adaptation field indicate the preference of whether the header portions of the data packets are to be removed prior to their communication upon the radio link. When, as described above, the communication session is to be a VoIP session, the header portions are removed and the values of the header adaptation field are selected to initiate their removal.

As the two-bit length of the header adaptation field permits four possible combinations of digital values, one of the digital values is a spare combination. Another combination, defines a no header adaptation preference. And additional combinations define a header removal preference and a header removal not possible indication. For instance, in the exemplary implementation, logical values "00" placed in the header adaptation field indicate a no header adaptation preference. Logical values of "01" placed in the header adaptation field indicate a header removal preference; logical values of "10" placed in the header adaptation field indicate a header removal not possible indication, and logical values of "11" placed in the header adaptation field are a spare combination.

Thereby, a new header adaptation field formed in the QoS information element defined pursuant to proposals for set forth for a 3 GPP system provides a manner by which to facilitate selection of removal of the header portions of data packets prior to their communication upon a radio link. Improved communication capacity in the communication system is thereby possible.

The previous descriptions are of preferred examples for implementing the invention, and the scope of the invention should not necessarily be limited by this description. The scope of the present invention also covers all modifications, amendments, additions and deletions of features within the abilities of a skilled man. As an example, the mode selection procedure has been described with reference to the codec selection but may also consist in a conversion modes selection of other type, a protocol selection procedure or the like.

The invention claimed is:

1. An apparatus for initiation of header-portion removal in a radio communication system comprising a mobile station operable to communicate packet-switched data with a correspondent node by way of network infrastructure, the packet-switched data formatted into data packets, the data packets having header portions and payload portions, the header-portion removal facilitating communication of the packet-switched data upon a radio link formed between the mobile station and the network infrastructure, said apparatus comprising:

a quality of service information element message generator coupled to receive indications of selection of a preference to communicate data without the header portions upon the radio link, said quality of service information element message generator for generating a quality of service information element message containing an indication of the preference, wherein the quality of service information message element includes a header adaptation field and wherein the indication of the preference is contained in the header adaptation field, and wherein the quality of service information element message comprises a plurality of octets and wherein the header adaptation field is formed in a final octet of the quality of service information element message.

2. The apparatus of claim 1, wherein said quality of service information element message generator is positioned at the mobile station.

3. The apparatus of claim 1, wherein the quality of service information element defines a plurality of fields and wherein the indication of the preference is contained in a selected field of the plurality of fields.

4. The apparatus of claim 3, wherein the radio communication system comprises a (third generation) cellular communication system, wherein the correspondent node comprises a voice over internet protocol terminal and the packet-switched data comprises voice over internet protocol data for effectuating a voice over internet protocol communication session, and wherein the quality of service information element message generated by said quality of service information element message generator is generated prior to the voice over internet protocol communication session.

5. The apparatus of claim 4, wherein the indication of the preference contained in the selected field is contained in a field appended to, and forming a portion of, the message.

6. The apparatus of claim 5, wherein the quality of service information element message generated by said quality of service information message generator is defined generally pursuant to a third generation partnership project European telecommunication standard, section 24.008 v4.1.1 promulgation.

7. The apparatus of claim 1, wherein the quality of service information element comprises fourteen octets and wherein the header adaptation field is contained in the fourteenth octet of the quality of service information element.

8. The apparatus of claim 1, wherein the header adaptation field is of a two-bit length.

9. A method for initiation of header-portion removal in a radio communication system, said method comprising:
   selecting a preference whether to communicate data packets without the header portions on a radio link,
   wherein the radio communication system comprises a mobile station operable to communicate packet-switched data with a correspondent node by way of network infrastructure, the packet-switched data formatted into data packets, the data packets comprising header portions and payload portions, the header-portion removal facilitating communication of the packet-switched data upon the radio link formed between the mobile station and the network infrastructure; and
   generating a quality of service information element message containing an indication of the preference,
   wherein the quality of service information message element includes a header adaptation field and wherein the indication of the preference is contained in the header adaptation field, and
   wherein the quality of service information element message comprises a plurality of octets and wherein the header adaptation field is formed in a final octet of the quality of service information element message.

10. The method of claim 9, wherein said selecting and generating are performed at the mobile station, and said method further comprising:
   sending the quality of service information element message upon the radio link.

* * * * *